May 8, 1956  R. E. DARLING  2,745,074
ELECTRICALLY EQUIPPED OXYGEN HOSE
Filed Jan. 11, 1951
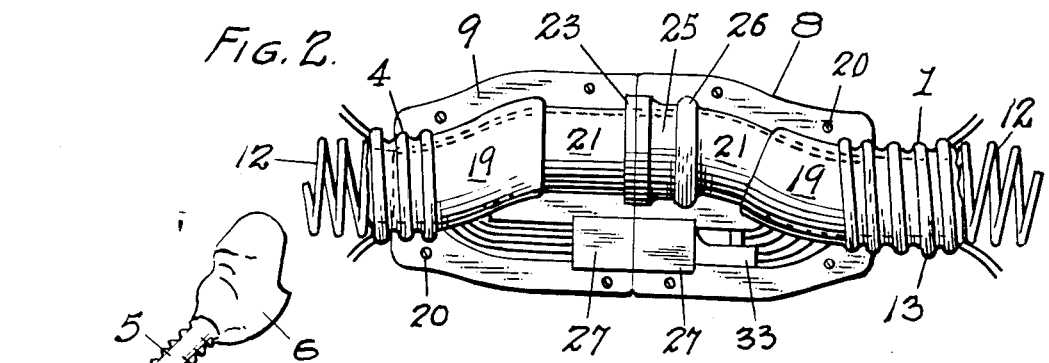
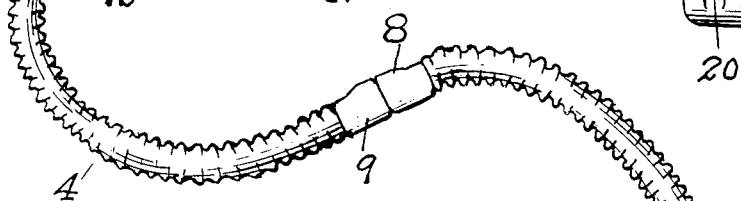
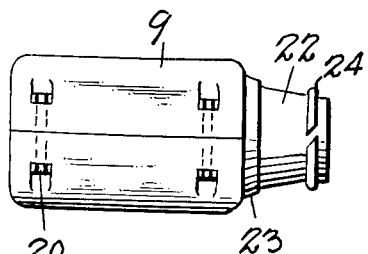
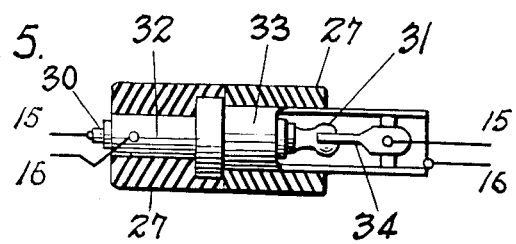
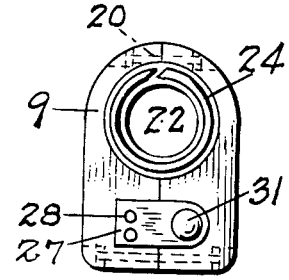
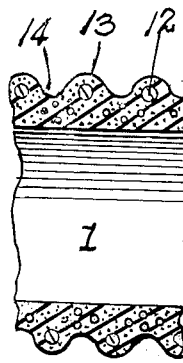
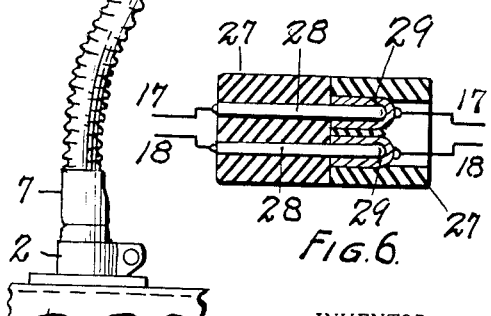
INVENTOR.
RALPH E. DARLING
BY
Charles K. Davies & Son
Attys.

United States Patent Office 2,745,074
Patented May 8, 1956

2,745,074
ELECTRICALLY EQUIPPED OXYGEN HOSE

Ralph E. Darling, Bethesda, Md.

Application January 11, 1951, Serial No. 205,597

2 Claims. (Cl. 339—16)

The present invention relates to electrically equipped oxygen hose forming part of the personal equipment for aircraft pilots and other aviators, and included in a quick disconnect assembly of the piots oxygen breathing gear especially designed for use in high-speed aircraft while in flight. The novel oxygen equipment or gear includes a standardized trunk line hose, preferably but not necessarily in sections, which also carries electrical circuits for earphones, microphone, radio or other electrical service instruments; and the ends of a trunk line hose, or the ends of sections constituting the oxygen hose, are equipped with connector units, in which are mounted electrical contacts for the circuits. In the oxygen gear, a single trunk line hose or a sectional hose, is combined and arranged for quick and automatic separation, as by and with the initial movement of an ejecting operation when an aviator and his seat are expelled from an aircraft.

The novel equipment of the invention involves a minimum number of standardized parts that may be manufactured with facility, the parts may be assembled and adjusted with ease, and the mechanical and electrical parts are combines and arranged to insure safety, durability, a maximum of efficiency and with a minimum of bulk and weight, to accupy a minimum of space.

In the accompanying drawings I have illustrated one complete example of a physical embodiment of the invention wherein the parts are combined and arranged in a sectional oxygen hose according to one mode I have devised for the practical application of the principles of the invention. It will be understood, however, that invention is also embodied in a single or one-piece hose, and that changes and alterations are contemplated and may be made in these exemplifying drawings and mechanical and electrical structures, within the scope of the appended claims, without departing from the principles of the invention.

Figure 1 is a view of the oxygen breathing hose equipped with connector units and required electrical connections.

Figure 2 is an inner face view of a split connector with end portions of the hose sections clamped therein, and indicating the detachable electrical contacts mounted in the two units of the connector.

Figure 3 is a top plan view of one of the connector units; and Figure 4 is a face view of this connector.

Figure 5 and Figure 6 are enlarged detail sectional views of the plug and socket contacts or connections for the electrical circuits and Figure 7 is an enlarged detail view, partly in section at one end of a reinforced hose section, showing also the electrical circuit wires integrated in the wall of the hose.

In Fig. 1 a portion of the personal gear of an aircraft pilot is indicated with the oxygen breathing trunk hose 1 of rubber, or other suitable elastic material, anchored by a connector 2 to a portion of the console 3 located as usual in the cockpit of an aircraft. A sectional extension of the trunk line includes separable hose sections 4 and 5, with the latter section attached to the pilot's mask 6.

The lower end of the trunk line 1 is equipped with a connector unit 7 that anchors it to the console receptacle, and the upper end of this hose is equipped with a socket connector unit 8 that is detachably connected with a plug unit 9 mounted on one end of the extension 4. The extension 4 and the pilots hose 5 are connected by units 10 and 11 of a disconnect or connector, these units being similar in construction and operation to the units 8 and 9 of the other connector or disconnect.

Each of the reinforced, elastic and resilient, non-collapsible and standardized hose sections 1 and 4, as well as the pilots hose, has integrated in its wall a helical or spirally arranged wire spring 12 that is here shown as encased or embedded within an exterior continuous spiral rib or ridge 13, to add strength and resiliency to the rubber or other elastic material of the hose.

In addition to the function of conveying breathing oxygen therethrough, these smooth bore sections also form carriers for electrical circuit wires of the pilots earphones, radio, microphone, or other electrical instruments. These wires or electrical conductors, like the spring, are embedded or integrated within the hose wall in spiral arrangement to permit flexing, and to insure against breaking, short circuiting, or entanglement with other accessories of the pilots gearing. The coils of the conductor wires, which are located in the normal thickness of the hose wall between the coils of the spring, and together with the spring, reinforce the elastic walls of the hose sections against excessive lateral pressure and expansion due to the flow of oxygen under pressure, that would otherwise tend to deform the hose.

The continuous exterior spiral rib or ridge of the hose that encases the spring forms an exterior spiral groove 14 that eliminates excessive thickness in its wall, and within this reduced but ample thickness of the wall a suitable number of lead wires or electrical conductors, as 15 and 16 and 17 and 18 are encased for electrical circuits.

The opposite ends of these wires pass outwardly through integral nipples or attaching sleeves 19 of the elastic hose for connection with pairs of electrical contacts or terminals mounted within the hollow plug and socket units of a disconnect or connector. Each of the several disconnects or connectors forming detachable joints consists of a split socket unit and a split plug unit of suitable material, and each unit is provided with complementary interior voids; the split sections of a unit being clamped together as by screw bolts 20 and countersunk nuts. As seen in Fig. 1 each unit encloses a mechanical coupling member for the hose, as 21 and 21, of aluminum, hardened plastic or other appropriate material, and a plane outer end of each of these oxygen tubes an attaching nipple or sleeve 19 of the hose is fitted and securely clamped by the screw bolts 20 of the connector units.

For mechanically connecting or coupling two hose sections each connector tube or lining 21 of a plug unit, as 9, terminates in a tubular head or projecting plug 22 having an exterior packing gasket 23, and this plug or attaching head is equipped with an exterior split resilient ring 24 that forms part of a resiliently retained snap joint for insertion into a complementary socket member 25 of the connector tube or lining 21 mounted in the socket unit of the connector. This end socket 25 which receives the plug 22 is fashioned with an exterior annular rib 26 which provides an inner annular groove for the resilient fastening ring 24 of the plug unit, and this connection provides, an ample breaking force, for instance eighty pounds, that is sufficient to preclude inadvertent or accidental disconnection of the hose sections, or joints.

The pairs of wires for the electrical circuits are attached to complementary sets of detachable terminals or contacts, which as here shown include complementary insulating blocks 27, 27, which extend transversely of the plug and socket units and are rigidly clamped therein by the screw bolts 20. For one circuit the insulating block 27 of a plug unit, as 9, has embedded therein a pair of projecting contact pins 28, which as best seen in Fig. 6, are inserted within and coact with a complementary pair of sockets or conducting tubes 29 that are fixed within the insulating block 27 of the socket unit 8 of a connector.

For connecting the wires of another electrical circuit, as in Fig. 5, the plug unit of a connector is equipped with a composite plug or jack that includes a central pin 30 having a projecting contact head 31 which is encased within and insulated from a conducting sleeve 32, and the respective wires are attached to the central pin and its insulated jacket or sleeve.

The complementary socket unit of this electrical connection includes a semi-cylindrical or cut-away conducting tube 33 embedded in the insulating block 27, and to which one wire is attached, and a resilient conducting blade 34, for frictional and electrical engagement with the spherical head 31 of the plug or jack, is mounted in and insulated from the conducting tube and connected to the other circuit wire.

Under proper conditions, it will be apparent that the mechanical and electrical connections between a socket unit and a plug unit of a disconnect or connector of the hose, while properly performing the functions of a joint for the hose, may, when necessary be disconnected or separated in the manner previously set forth.

Having thus fully described my invention, what I claim as new and desire to secure by Letters Patent is:

1. In combination with an oxygen hose consisting of two sections each having electrical conductors integrated within its wall, an integral end sleeve on each section, and a pair of resiliently engaged separable coupling tubes fitted in said sleeves, a pair of mechanical coupling units having voids and embracing the end sleeves and tubes, an insulation block mounted in each unit laterally of its coupling tube, a plug-contact forming a terminal in one block and a socket-contact forming a terminal within the other block, and each conductor having an end exterior of a hose wall projecting through a void and attached to a terminal contact.

2. In combination with an oxygen hose consisting of two sections each having electrical conductors integrated within its wall, an integral end sleeve on each section, a pair of telescoping coupling-tubes mounted in the adjoining ends of the sleeves and coacting to form a resiliently retained snap-joint, mechanical coupling means embracing the sleeve tubes and snap joint and consisting of two sectional clamp units, separate means for clamping the two sectional units, an insulated block mounted within each clamp unit in parallelism with the tubes, a plug contact forming a terminal for the conductors of one hose-section and mounted in one block, and a complementary socket-contact forming a terminal for the conductors of the other hose-section mounted in the other block.

References Cited in the file of this patent
UNITED STATES PATENTS

| | | |
|---|---|---|
| 539,000 | Fowler | May 7, 1895 |
| 738,503 | Waters | Sept. 8, 1903 |
| 1,105,795 | Johnston | Aug. 4, 1914 |
| 1,154,259 | Light | Sept. 21, 1915 |
| 1,223,864 | French | Apr. 24, 1917 |
| 1,856,455 | Banks, et al. | May 3, 1932 |
| 2,014,288 | Noschang | Sept. 10, 1935 |
| 2,291,070 | Bruno | July 28, 1942 |
| 2,320,367 | Leathers | June 1, 1943 |
| 2,479,483 | Ekleberry | Aug. 16, 1949 |
| 2,510,125 | Meakin | June 6, 1950 |
| 2,542,536 | Kirksey | Feb. 20, 1951 |
| 2,634,311 | Darling | Apr. 7, 1953 |

FOREIGN PATENTS

| | | |
|---|---|---|
| 15,324 | Great Britain | of 1888 |